United States Patent [19]

Muntz

[11] 4,185,466
[45] Jan. 29, 1980

[54] PARTIAL PRESSURE CONDENSATION PUMP

[75] Inventor: Eric P. Muntz, Pasadena, Calif.

[73] Assignee: Grumman Aerospace Corporation, Bethpage, N.Y.

[21] Appl. No.: 891,667

[22] Filed: May 22, 1978

[51] Int. Cl.² ............................................. B01D 5/00
[52] U.S. Cl. ...................................... 62/55.5; 55/269; 55/418; 62/268
[58] Field of Search .................... 62/55.5, 100, 268; 55/269, 319, 418, DIG. 15; 417/901

[56] References Cited

U.S. PATENT DOCUMENTS

| | | | |
|---|---|---|---|
| 3,155,310 | 11/1964 | Lorenz | 62/55.5 |
| 3,164,320 | 11/1965 | Welbourn | 62/55.5 |
| 3,382,585 | 5/1968 | Blake et al. | 62/55.5 |
| 3,455,121 | 7/1969 | Beauregard et al. | 62/268 |
| 4,023,398 | 5/1977 | French et al. | 62/55.5 |

*Primary Examiner*—Ronald C. Capossela
*Attorney, Agent, or Firm*—Harris, Kern, Wallen & Tinsley

[57] ABSTRACT

A partial pressure condensation pump for increasing the partial pressure of a gas or gases in a gas-vapor mixture, without mechanical pumping, while removing a vapor or vapors from the mixture and while conserving the relative abundances of the gaseous species present. More particularly, the invention comprises a pump which includes a housing providing a flow passage having an inlet and an outlet at the downstream end thereof, a vapor condenser in the flow passage downstream from the inlet, means for suppressing back diffusion of gas toward the inlet, and outflow metering means controlling flow through the outlet for balancing the outgoing gas flow through the outlet and the incoming gas flow through the inlet. In certain embodiments, the suppressing means includes a flow barrier between the inlet and the vapor condenser and having openings therethrough, and, in a presently preferred species of this type, the flow barrier comprises a jet membrane having upstream-facing probes defining the openings therethrough. The suppressing means, in another presently preferred embodiment, may also include locating the vapor condenser a substantial distance downstream from the inlet, adjacent the downstream end of a downstream-convergent portion of the flow passage.

14 Claims, 5 Drawing Figures

PARTIAL PRESSURE CONDENSATION PUMP

BACKGROUND OF INVENTION

The present invention relates to what I term a partial pressure condensation pump and, more particularly, to a device for increasing the partial pressure of a gas or gases in a gas-vapor mixture, without mechanical pumping.

More particularly, it is desirable in many instances to increase the partial pressure of one or more gaseous species of a gas-vapor mixture. (For the purpose of the present application, the term "vapor" is defined as a component of a gas-vapor mixture which has a significantly lower vapor pressure than the "gas" or "gases", i.e. lower by a factor of five or greater). If only the gases need be compressed and their mole fraction is small, mechanical pumping to increase the partial pressure thereof is wasteful. This is particularly true if the gases must, in any case, be separated from the vapor eventually. In addition to increasing the partial pressure of the gas or gases, it is frequently desirable to conserve the relative abundances of the gases during the process of increasing partial pressure.

Relevant prior art comprises the following:

| Reference No. | U.S. Patent No. | Publication |
|---|---|---|
| (1) | Hamel et al Patent No. 4,084,943. Issued April 18, 1978 | |
| (2) | | E. P. Muntz, B. B. Hamel, B. L. Maguire, AIAA J 1651, 8, 9, 1970 |
| (3) | | T. Deglow, PhD Thesis, University of Southern California, June 1977 |

OBJECTS AND SUMMARY OF INVENTION

With the foregoing background in mind, a primary object of the invention is to provide a partial pressure condensation pump for increasing the partial pressure of a gas or gases in a gas-vapor mixture, without mechanical pumping, while removing a vapor or vapors from the mixture, and while conserving the relative abundances of any gaseous species present.

More particularly, the invention may be summarized as comprising, and an important object of the invention is to provide, a partial pressure condensation pump which is capable of performing the foregoing functions, and which includes a housing providing a flow passage having an inlet at the upstream end of the flow passage and an outlet at the downstream end thereof, a vapor condenser in the housing downstream from the inlet, and means for suppressing back diffusion of gas toward the inlet. A related object is to provide outflow metering means, controlling gas flow through the outlet, for balancing the outgoing gas flow through the outlet and the incoming gas flow through the inlet.

An important object in connection with certain embodiments of the invention is to provide a flow barrier, with openings therethrough, in the flow passage between the inlet and the vapor condenser, to aid in suppressing back diffusion of gas.

Another important object is to provide a partial pressure condensation pump wherein the flow barrier comprises a jet membrane having upstream-facing probes defining the openings therethrough, as fully disclosed in Reference No. (1) above.

Another object is to provide a back diffusion suppressing means which comprises means for producing gas-molecule penetration distances downstream from flow barrier probes which are large compared to the inside lateral dimensions, e.g., the inside diameters, of the probes. A related object is to provide a structure wherein the product of the probe inside diameter, D, and the jet membrane background pressure, or inlet pressure, $P_{T1}$, are so related that $P_{T1}D^2 \gtrsim 1$ torr-mm$^2$.

Yet another object of the invention is to provide a partial pressure condensation pump wherein the back diffusion suppressing means comprises locating the condenser a substantial distance downstream from the flow barrier and adjacent the downstream end of a downstream-convergent portion of the flow passage, thereby providing a relatively high flow speed upstream from the condenser to suppress back diffusion, while keeping both the upstream area of the flow passage and the smaller downstream area thereof relatively large to minimize pressure loss due to frictional flow resistance. This structure may be used with or without a flow barrier.

Another object is to produce condensate flow in a direction opposite to the mixture flow so as to expose the condensate to a lower gas partial pressure for a longer period of time, and to a higher gas partial pressure for a shorter period. This counterflow arrangement is particularly advantageous if the gas or gases are soluble in the condensate since gas losses are minimized.

Still another object is to provide a condenser which allows condensate flow normal to the flow passage through the housing, and which includes an area open to flow through the housing at least 10 times the total inside area of the probes defining the openings through the flow barrier.

The foregoing objects, advantages, features and results of the present invention, together with various other objects, advantages, features and results thereof which will be evident to those skilled in the art of increasing the partial pressure of a gas or gases in a gas-vapor mixture, may be attained with the exemplary embodiments of the invention illustrated in the accompanying drawings and described in detail hereinafter.

DESCRIPTION OF EXEMPLARY EMBODIMENTS OF INVENTION

Figure 1:
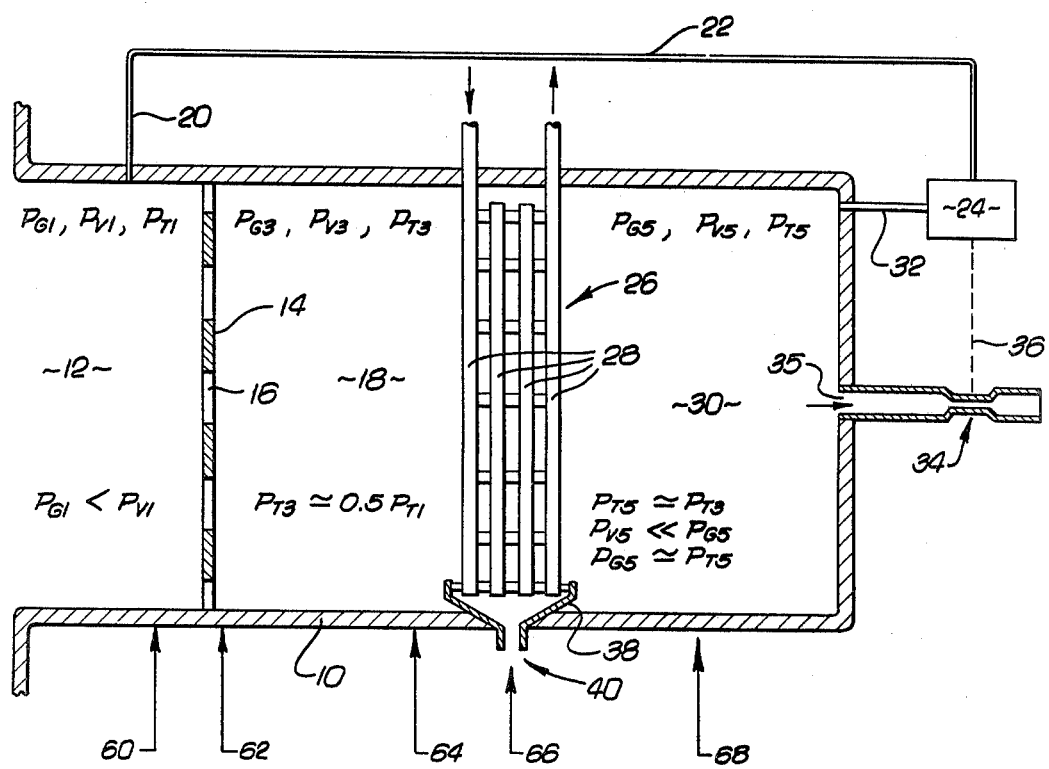
FIG. 1 is a schematic view of a partial pressure condensation pump of the invention shown in longitudinal section.

Referring initially to FIG. 1 of the drawings, illustrated therein is a partial pressure condensation pump of the invention shown as comprising a housing 10 having a flow passage therethrough and provided at the upstream end of the flow passage with an inlet 12 for a gas-vapor mixture from any suitable source. A flow barrier 14 is located in the housing 10 downstream from the inlet 12 and is shown as a simple plate provided with orifices 16 therethrough which connect the inlet to a condenser chamber 18. A pressure probe 20 communicates with the inlet and is connected by a line 22 to a control 24.

Downstream from the chamber 18 is a condenser 26 having a number of vertical tubes 28, four being shown, receiving and discharging a coolant. Vapor in the gas-vapor mixture condenses on the tubes 28 so that enriched gas passes through the condenser 26 to an accumulator or accumulator chamber 30. A pressure probe 32 communicates the pressure in the chamber 30 to the control 24.

An outflow metering means 34 is located in an outlet 35 at the downstream end of the flow passage through the housing 10 and is connected, as indicated at 36, to the control 24. The outflow metering means 34 so regulates the pressure in the chamber 30 that it approximates the total pressure of the gas-vapor mixture at the inlet 12. More particularly, the outflow metering means controls flow through the outlet 35 in such a manner that the outgoing gas flow through the outlet and the gas flow entering the inlet 12 are balanced. The control 24 is so set as to make the outgoing gas pressure at 35 as close as possible to the incoming mixture pressure at 12.

Below the condenser 26 is a trap 38 for collecting condensed vapor draining from the condenser 26, the condensate draining through an opening 40. As will be noted, the condenser tubes 28 constitute means providing for condensate flow normal to the flow passage through the housing 10. The condenser 26 includes an area open to flow therethrough at least 10 times the total open area of the orifices 16 through the flow barrier 14.

As hereinbefore discussed, if gas solubility in the condensate is a problem, condensate counterflow is desirable. This may, for example, be achieved by so orienting the pump that the gas flows upwardly through the condenser 26, whereby the condensate flows downwardly, against the flow of gas, to a suitable condensate collector and drain.

Figure 2:
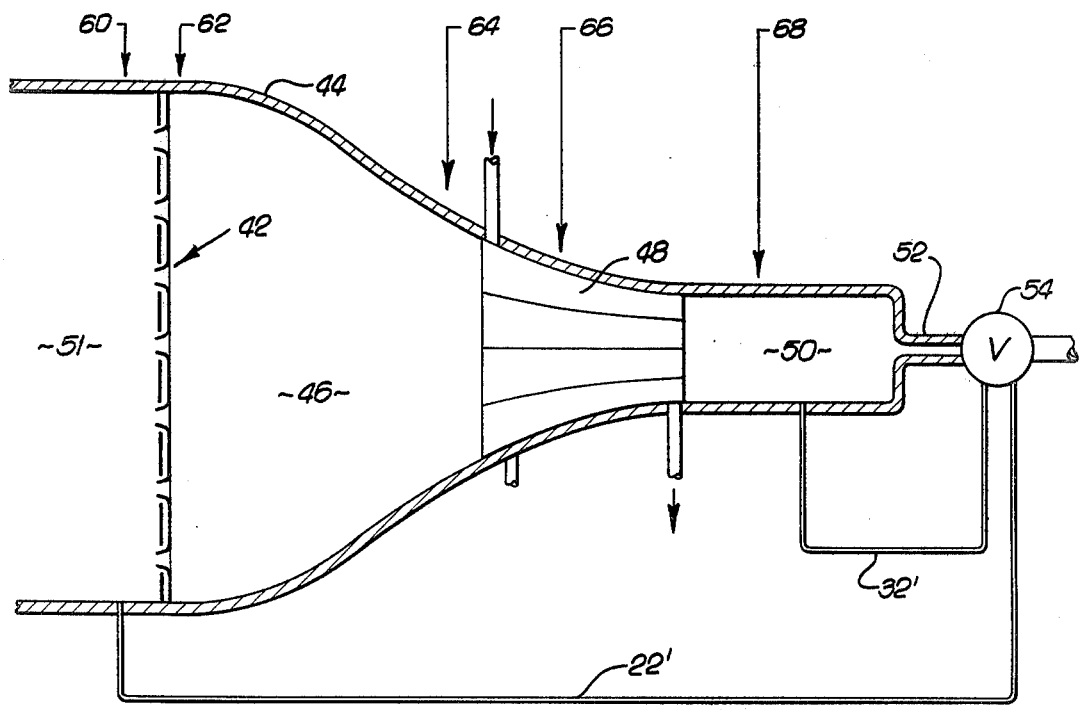
FIG. 2 is a schematic view of an alternative, and presently preferred, partial pressure condensation pump of the invention, also in longitudinal section.

Turning to FIG. 2 of the drawings, the embodiment of the invention illustrated therein utilizes as the flow barrier a jet membrane 42 as disclosed in Reference No. (1), U.S. Pat. No. 4,084,943, as hereinbefore indicated. The partial pressure condensation pump of FIG. 2 also differs in that its housing 44 provides a downstream-convergent flow passage having a downstream-convergent chamber 46 between the jet membrane flow barrier 42 and a condenser 48 adjacent the downstream end of the downstream-convergent portion of the flow passage. Downstream from the condenser 48 is an accumulator or accumulator chamber 50 of smaller diameter than the inlet 51 of the pump. An outlet 52 at the downstream end of the flow passage is provided with outflow metering means 54 corresponding to the outflow metering means 34 previously described. Pressure probes communicating with the inlet 51 and the chamber 50 are connected to the outflow metering means 54 by lines 22' and 32', respectively, and cause this outflow metering means to operate in essentially the same manner as the outflow metering means 34 in balancing the outgoing gas flow through the outlet 52 and the incoming gas flow entering the inlet 51.

By reducing the flow-passage area in the downstream direction, the downstream-convergent flow passage of FIG. 2 progressively increases flow velocity upstream of the condenser 48, and maintains the gas pressure at substantially the inlet pressure as vapor is removed by the condenser 48. It will be understood that the gas flow velocity decreases in the condenser 48 as condensate is removed from the mixture.

If desired, the flow barriers 14 and 42 may be interchanged in FIGS. 1 and 2. In other words, the flow barrier 14 may also be used in FIG. 2, and the flow barrier or jet membrane 42 may also be used in FIG. 1. Further, as will be discussed hereinafter, the embodiment of FIG. 2 may also be used without a flow barrier.

Turning to an important aspect of the invention, means is provided for suppressing back diffusion of gas through the flow barrier 14 or 42, it being essential that gas flow or diffusion occur predominantly in one direction only, i.e., from left to right, as viewed in FIGS. 1 and 2.

Considering the foregoing in more detail with particular reference to the embodiment of FIG. 2 of the drawings, one form of back diffusion suppressing means comprises means for producing gas-molecule penetration distances downstream from the probes of the jet-membrane flow barrier 42 which are large compared to the inside diameters of the probes. In other words, the value of $R_P$ discussed in Reference No. (1) is made large as compared to the probe inside diameters of the jet membrane 42, e.g., several times the probe inside diameters. Such a value for $R_P$ is achieved by providing a structure wherein the product of the probe inside diameter, D, and the jet membrane inlet or background pressure, $P_{T1}$, are so related that $P_{T1}D^2 \gtrsim 1$ torr-mm$^2$.

Another approach to the suppression of back diffusion of the gas or gases is to utilize, with or without the jet membrane 42, the downstream-convergent flow passage shown in FIG. 2 of the drawings. Considering the case where the jet membrane 42 is used, the small jets emanating from the jet-membrane probes form a large continuum flow which is then accelerated, due to the flow passage convergence, toward the condenser 48, which is located a substantial distance downstream from the jet membrane 42 and adjacent the downstream end of the downstream-convergent portion of the flow passage. With this construction, the region of high gas partial pressure is removed from the region of the jets emanating from the sampling probes of the jet membrane 42. Back diffusion is thus reduced since the concentration gradient driving the back diffusion can be reduced more or less arbitrarily by lengthening the distance of the condenser 48 downstream from the jet membrane 42. A slight loss in pressure results from this lengthening, but this is kept quite small by keeping both the upstream area of the flow passage and the smaller downstream area thereof relatively large to minimize pressure loss due to frictional flow resistance.

With the downstream-convergent flow passage of FIG. 2, the flow barrier 14 or 42 can be omitted if the velocity through the flow passage is kept high enough to suppress back diffusion of gas, by removing the region of high gas partial pressure from the region of the inlet 51 so as to reduce the concentration gradient driving the back diffusion, as discussed in the preceding paragraph. I have found that back diffusion of gas may be suppressed without a flow barrier by so selecting the convergence and area ratio in FIG. 2 that the velocity and the inlet end of the condenser 48 is of the order of 100 cm/sec for a condenser of the order of 10 cm in length, representing approximately an optimum condition.

Adverting to FIG. 1 of the drawings, it will be noted that there are pressure symbols at the tops of the inlet 12, the chamber 18 and the chamber 30. In these symbols, the letter "P" indicates pressure, the subscript "G" indicates gas, the subscript "V" indicates vapor, the subscript "T" indicates total, and the subscripts "1", "3" and "5" respectively relate to the inlet 12, the chamber 18 and the chamber 30. At the bottoms of these chambers are various legends indicating pressure relationships which will be apparent. It is important to note that, in the chamber 30, the partial gas pressure, $P_{G5}$, is much greater than the partial vapor pressure, $P_{V5}$, which is the important object of the invention. More particularly, the product of the partial pressure condensation pump of the invention is an increase in the partial gas pressure from $P_{G1}$ to approximately 0.5 $P_{T1}$. For example, if $P_{G1}$ equals 0.05 $P_{T1}$, the final partial gas pressure $P_{G5}$ would be approximately 0.5 $P_{T1}$. In other words the pump of the invention would have, under these conditions, compressed the gas to a pressure ratio of 10, which is the primary object. Similar gas and vapor partial pressure relationships apply to the species of FIG. 2 of the drawings.

Figure 3:
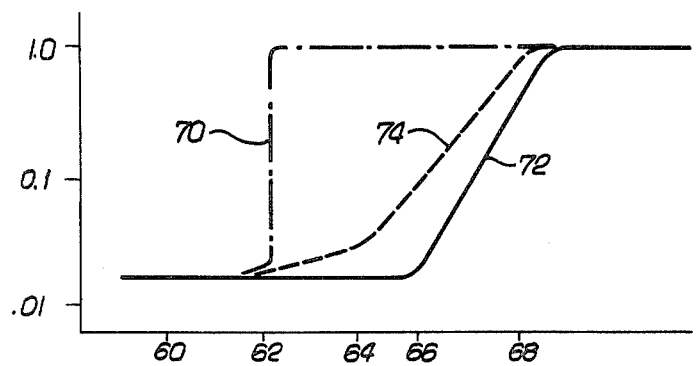
FIG. 3 is a diagram showing possible concentration or partial pressure profiles for the partial pressure condensation pumps of FIGS. 1 and 2.

FIG. 3 shows ratios of partial gas pressure to total mixture pressure under different conditions at various stations 60, 62, 64, 66 and 68 in the pumps of FIGS. 1 and 2. In profile 72, back diffusion of gas would present less of a problem than for profile 74, although both are possible. Profile 70 is also possible. With profile 70, the entire volume of the pump downstream from the flow barrier would be at uniform concentration. In this situation, the flow barrier must very effectively prevent back diffusion of gas since there is a large gas partial pressure gradient. To accomplish this, the $R_P$, Reference No. (2), of E. P. Muntz, B. B. Hamel, B. L. Maguire, AIAA J 1651, 8, 9, 1970, the flow must be sufficiently large in terms of orifice diameters to suppress the back diffusion. The flow must be a continuum flow in each of the tubes or orifices, and the value of $D^2 P_{T1}$ (where D is the orifice diameter) can be obtained from the relationships given by Reference No. (2) E. P. Muntz, B. B. Hamel, B. L. Maguire, AIAA J 1651, 8, 9, 1970, and Reference No. (3) T. Deglow, PhD Thesis, University of Southern California, June, 1977, and should be greater than 1 torr-mm².

In the case of profile 72 of FIG. 3, the flow through the orifices could permit relatively more back diffusion since the relative concentration of gas and vapor has not changed significantly across the flow barrier 14. In this case, transition or molecular flow could occur in the orifices if, for instance, the diffusion separation of two gaseous species were useful. Under these circumstances, $P_{T3}$ might be closer to 0.25 $P_{T1}$ in order to suppress the preferential re-mixing of the lighter species. Also, the achievement of profile 72 of FIG. 3 would require in general the longitudinal pump section shown in FIG. 2. This pump configuration permits higher axial flow speeds in the condenser, thus limiting back diffusion to the condenser region. The penalty paid here, of course, is a slightly higher total pressure drop across the condenser. With no flow barrier, the pressure drop in the pump is minimized.

Figure 4:
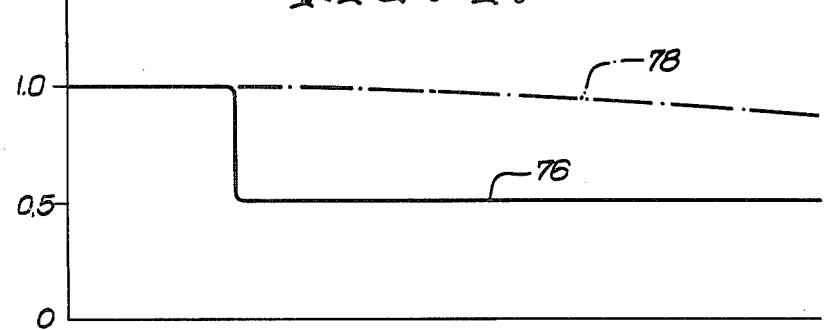
FIG. 4 is a pressure profile of pressure drops with and without a flow barrier incorporated in the partial pressure condensation pump of the invention.

In FIG. 4, 76 is a profile of the pressure drop across the flow barrier, e.g., a 2 to 1 pressure drop. The profile 78 is for the case, discussed above, where no flow barrier is used in FIG. 2.

Figure 5:
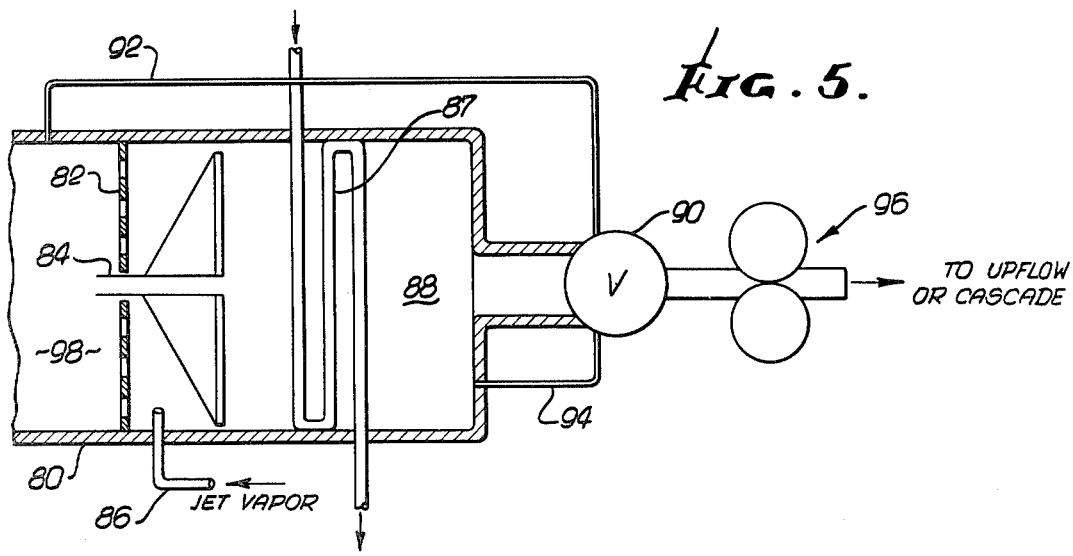
FIG. 5 is a schematic illustration of a system embodying the invention.

In the schematic of FIG. 5, the gas separating apparatus, as shown by Reference No. (1), U.S. Pat. No. 4,084,943 is modified to include an annular housing 80 having a flow barrier 82 with a moveable tube 84 through an opening and about which jet gas from the inlet 86 is exhausted to enrich the gas-vapor mixture from pipe 84. A condenser 87 condenses the vapor as before, for enriched gas supply to the accumulator 88. A valve 90 is controlled by a comparison of the pressures of the accumulator chamber 88 and the gas-vapor mixture chamber 98, as by lines 94 and 92, respectively. A pump 96 is then employed to deliver the enriched gas therebeyond, as to another stage of a separation cascade.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. In a partial pressure condensation pump for increasing the partial pressure of a gas or gases in a gas-vapor mixture while removing a vapor or vapors from the mixture, the combination of:
   (a) a housing providing a flow passage having an inlet at the upstream end of said flow passage and an outlet at the downstream end thereof;
   (b) a vapor condenser in said housing downstream from said inlet;
   (c) means for suppressing back diffusion of gas toward said inlet; and
   (d) outflow metering means controlling gas flow through said outlet for balancing the outgoing gas flow through said outlet and the incoming gas flow through said inlet.

2. A partial pressure condensation pump according to claim 1 wherein said suppressing means includes a flow barrier in said housing between said inlet and said vapor condenser, and provided with openings therethrough.

3. A partial pressure condensation pump as defined in claim 2 wherein said flow barrier comprises a jet membrane having upstream-facing probes defining said openings therethrough.

4. A partial pressure condensation pump as set forth in claim 3 wherein said suppressing means also includes means for producing gas-molecule penetration distances downstream from said probes which are large compared to the inside lateral dimensions of said probes.

5. A partial pressure condensation pump according to claim 1 wherein said suppressing means comprises a downstream-convergent portion of said flow passage of substantial length with said condenser located a substantial distance downstream from said inlet and adjacent the downstream end of said downstream-convergent portion.

6. A partial pressure condensation pump as set forth in claim 5 including a flow barrier in said housing between said inlet of said flow passage and said downstream-convergent portion of said flow passage, with openings through said flow barrier.

7. A partial pressure condensation pump as defined in claim 1 wherein said condenser includes means providing for condensate flow in a desired direction relative to gas flow through said flow passage.

8. In a partial pressure condensation pump for increasing the partial pressure of a gas or gases in a gas-vapor mixture while removing a vapor or vapors from the mixture, the combination of:
  (a) a housing providing a flow passage having an inlet at the upstream end of said flow passage and an outlet at the downstream end thereof;
  (b) a flow barrier in said housing downstream from said inlet and provided with openings therethrough;
  (c) a vapor condenser in said housing downstream from said flow barrier; and
  (d) means for suppressing back diffusion of gas through said flow barrier.

9. In a partial pressure condensation pump for increasing the partial pressure of a gas or gases in a gas-vapor mixture while removing a vapor or vapors from the mixture, the combination of:
  (a) a housing providing a flow passage having an inlet at the upstream end of said flow passage and an outlet at the downstream end thereof;
  (b) a flow barrier in said housing downstream from said inlet and provided with openings therethrough;
  (c) means for suppressing back diffusion of gas through said flow barrier;
  (d) a vapor condenser in said housing downstream from said flow barrier; and
  (e) outflow metering means controlling gas flow through said outlet for balancing the outgoing gas flow through said outlet and the incoming gas flow through said inlet.

10. A partial pressure condensation pump according to claim 9 wherein said flow barrier comprises a jet membrane having upstream-facing probes defining said openings therethrough.

11. A partial pressure condensation pump according to claim 10 wherein said suppressing means comprises means for producing gas-molecule penetration distances downstream from said probes which are large compared to the inside lateral dimensions of said probes.

12. A partial pressure condensation pump as defined in claim 11 wherein said probes are internally circular and wherein the product of the probe inside diameter, D, and the jet membrane background pressure, $P_{J1}$, are so related that $$P_{J1}D^2 \gtrsim 1\,\text{torr-mm}^2.$$

13. A partial pressure condensation pump as defined in claim 9 wherein said suppressing means comprises locating said condenser a substantial distance downstream from said flow barrier and adjacent the downstream end of a downstream-convergent portion of said flow passage.

14. A partial pressure condensation pump as defined in claim 9 wherein said condenser includes an area open to flow therethrough at least 10 times the total open area of said probes defining said openings through said flow barrier.

* * * * *